United States Patent
Marks (10) Patent No.: US 9,889,547 B2
(45) Date of Patent: Feb. 13, 2018

(54) SELECTIVE DEPLOYABLE TOOL HOOK

(71) Applicant: WORKTOOLS, INC., Chatsworth, CA (US)

(72) Inventor: Joel S. Marks, Sherman Oaks, CA (US)

(73) Assignee: WorkTools, Inc., Chatsworth, CA (US)

( * ) Notice: Subject to any disclaimer, the term of this patent is extended or adjusted under 35 U.S.C. 154(b) by 0 days.

(21) Appl. No.: 15/428,079

(22) Filed: Feb. 8, 2017

(65) Prior Publication Data

US 2017/0239799 A1  Aug. 24, 2017

Related U.S. Application Data

(60) Provisional application No. 62/299,367, filed on Feb. 24, 2016.

(51) Int. Cl.
  *B25C 7/00* (2006.01)
  *F16M 13/04* (2006.01)
  *F16B 45/00* (2006.01)

(52) U.S. Cl.
  CPC ........... *B25C 7/00* (2013.01); *F16B 45/00* (2013.01); *F16M 13/04* (2013.01)

(58) Field of Classification Search
  CPC .................................. B25C 7/00; B25F 5/02
  See application file for complete search history.

(56) References Cited

U.S. PATENT DOCUMENTS

| | | |
|---|---|---|
| 2,304,547 A | 12/1942 | Cutter |
| 3,286,315 A | 11/1966 | Price |
| 4,787,145 A | 11/1988 | Klicker et al. |
| 5,044,038 A | 9/1991 | Matkovic |
| 5,265,312 A | 11/1993 | Okumura |
| 5,930,903 A | 8/1999 | Hum et al. |
| 5,988,577 A | 11/1999 | Phillips et al. |
| 6,010,103 A | 1/2000 | Ashworth |
| 6,321,622 B1 | 11/2001 | Tsuge et al. |
| 6,679,406 B2 | 1/2004 | Sakai et al. |
| 6,722,549 B2 | 4/2004 | Shkolnikov et al. |
| 7,110,802 B1 | 9/2006 | Kim et al. |
| 7,111,364 B2 | 9/2006 | Bader et al. |
| 7,231,990 B2 | 6/2007 | Lai |
| 7,306,052 B2 | 12/2007 | Vahabi-Nejad et al. |
| 7,318,487 B2 | 1/2008 | Liao |
| 7,815,081 B2 | 10/2010 | Gist et al. |
| 7,942,299 B2 | 5/2011 | Steinbrunner et al. |
| 8,308,034 B2 | 11/2012 | Shibata et al. |
| 8,534,375 B2 | 9/2013 | Matsumoto et al. |

(Continued)

FOREIGN PATENT DOCUMENTS

DE  102004032788 A1  2/2006

*Primary Examiner* — Amy J. Sterling
(74) *Attorney, Agent, or Firm* — Paul Y. Feng; One LLP (57) ABSTRACT

An improved tool belt hook is selectively deployable on a portable tool or device. The hook structure is deployable in selected directions or positions on the tool. A stowed position is also preferably included wherein the hook structure is substantially contained within confines of the tool body to be out of a user's way. A closely integrated pushbutton release may allow the hook to rotate between selected operative positions and automatically engage to such position. The button is easily operated while effectively remaining within confines of the tool body. The tool hook assembly is compact and low cost.

19 Claims, 5 Drawing Sheets

(56) References Cited

U.S. PATENT DOCUMENTS

| | | | |
|---|---|---|---|
| 8,752,744 B2* | 6/2014 | Okouchi | B25F 5/02 224/268 |
| 2004/0156190 A1* | 8/2004 | Tsuruta | B23B 51/00 362/119 |
| 2006/0104735 A1 | 5/2006 | Zeiler et al. | |
| 2006/0144185 A1 | 7/2006 | Tsai | |
| 2006/0196902 A1 | 9/2006 | Chen | |

* cited by examiner

SELECTIVE DEPLOYABLE TOOL HOOK

CROSS-REFERENCE TO RELATED APPLICATIONS

This application claims priority to provisional application No. 62/299,367, filed Feb. 24, 2016, the entire contents of which are hereby incorporated by reference.

FIELD OF THE INVENTION

The present invention relates to hooks for hanging tools. More precisely, the present invention is directed to improvements to a tool mounted multi-position carrying hook.

BACKGROUND OF THE INVENTION

Tool hooks are typically used to carry a portable tool or like implements around a job site to leave the user's hands free to do other things such as climb a ladder, support or align construction components, operate other tools, or perform other tasks. One type of hook is separate from the tool device and attached to a user's belt or other user location while the tool is placed and replaced on the hook. Another type of hook is attached as part of the tool—the hook and associated tool are placed and replaced together on the user's belt or other user location. An example of the first type is a hook that is normally affixed to a tool belt upon which a tool is selectively placed. A common example of the second type is a tape measure with integrated hook.

SUMMARY OF THE INVENTION

The present invention in a preferred embodiment includes a hook that is normally attached to a portable or hand held tool or other device that is to be carried by a user. The hook is movable on the tool between different positions whereby the hook is usable at or from selectable locations of the tool. The hook may also include a stowed position in which it is not normally accessible for use. For example, the hook may selectively extend from a left and right side of a tool, or only one side, to accommodate different handed users. The hook may further be stowed out of the way to extend from neither side.

DETAILED DESCRIPTION OF THE PREFERRED EMBODIMENTS

Figure 1:
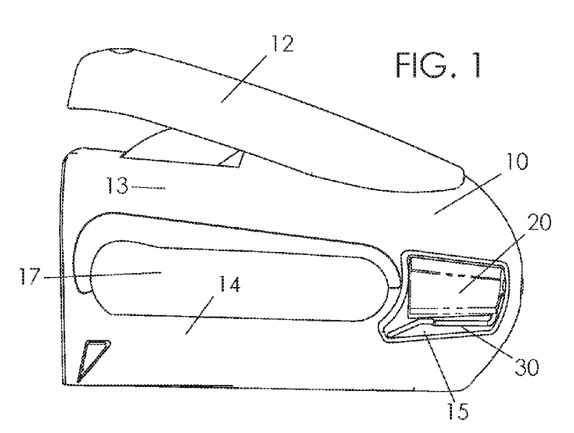
FIG. 1 is a left side elevational view of a tool incorporating a deployable belt hook, with the hook stowed.
Figure 2:
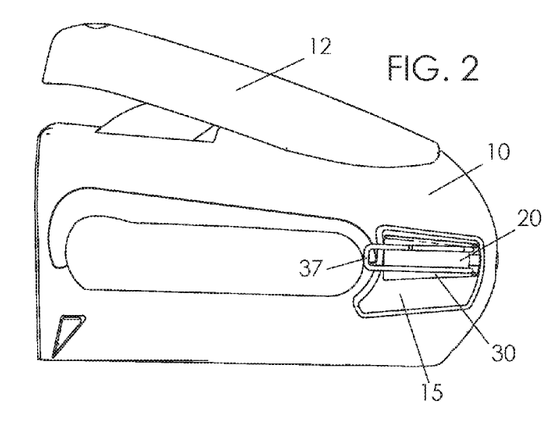
FIG. 2 is the tool of FIG. 1 with the hook deployed on a left side of the tool.
Figure 3:
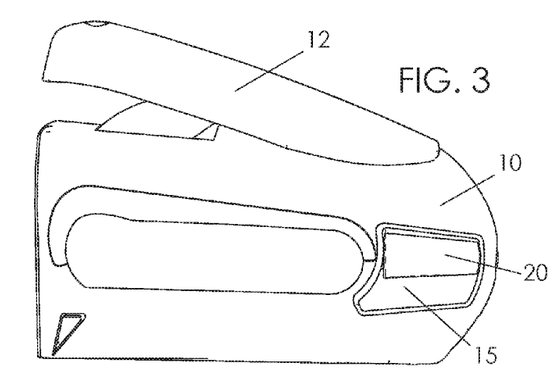
FIG. 3 is the tool of FIG. 1 with the hook, not visible, deployed on the right side of the tool.

FIGS. 1 to 3 show a preferred first embodiment of a hook assembly fitted to a rear of a staple gun type device. As illustrated, the staple gun is a "forward action" type with a pressing area of handle 12 being above the front area of body 10 where the staples are ejected (i.e., left side of the three side elevation views). A length of the body extends from the front to a rear. A selectively deployable belt hook subassembly is preferably fitted near or at a rear of grip opening 17 within cavity or opening 15 of body 10. Body 10 includes an upper grip area 13 above the grip opening and a lower body portion 14 under grip opening 17. Handle 12 forms an upper region of a grip portion of the tool. Preferably as shown, the hook subassembly is positioned lower and rearward on body 10 to clear the grip area of upper grip 13 and handle 12. In this manner, the hook features do not interfere with gripping, carrying and using the tool while also keeping the hook supported tool balanced in a convenient position for grasping and use.

Figure 1A:
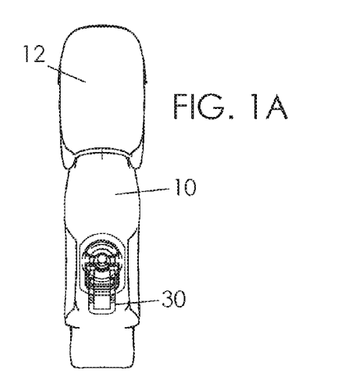
FIG. 1A a rear elevational view of the tool of FIG. 1

The hook subassembly includes rotatable hook support structure 20, release button member 40 and elongated hook 30. These elements are shown in most of the drawing figures. In FIG. 1, hook 30 is stowed between sidewalls of body 10, shown hidden in FIG. 1A. The hook subassembly preferably fits entirely, or nearly so, within confines of body 10 in the stowed condition. Therefore, the provision of the hook feature does not need to add any obstructions or bulk to the size of the tool with which it is used. In this position, the hook is fully out of the way to allow normal use of the staple gun or other tool. The movable hook structure is substantially confined within body 10 of the tool while body 10, or the tool overall including the hook, need not be enlarged to fit this structure or related attachments thereof although it may be so enlarged. In particular the stowed hook is confined between two sides of the body as well as preferably between a top and a bottom of the body or related structure. In FIG. 1 hook 30 is vertically aligned with hook 20, being below the support as illustrated. For example, a user who does not wish to use a belt hook will not suffer any compromise in the tool's function or bulk by its inclusion with the tool. As described here the bulk of the tool is an external overall size or envelope of the device wherein the stowed hook fits substantially entirely within the envelope of the tool. This contrasts with typical prior tool mounted hooks which necessarily protrude, or include mountings that add bulk, to an associated tool. Other implements to be carried, for example, hand and power tools and small household appliances, may be used in association with the present invention deployable hook.

Hook support 20 includes a longitudinal axis by which it is pivotally mounted to body 10. Button 40 includes round perimeter 43, FIG. 9. Hook support 20 includes boss 23 extending into housing recess 19, FIG. 8, hidden lines in FIG. 18. Together sides 43 and boss 23 form a pivot axis about which the hook subassembly pivots. Alternatively, perimeter 43 may be part of hook support 20, for example, with button coaxially fitted within a surrounding structure of hook support 20. Further, body 10 may include bosses that fit to recesses of the hook subassembly to provide the pivot axis. Other suitable mountings are contemplated.

Figure 2A:
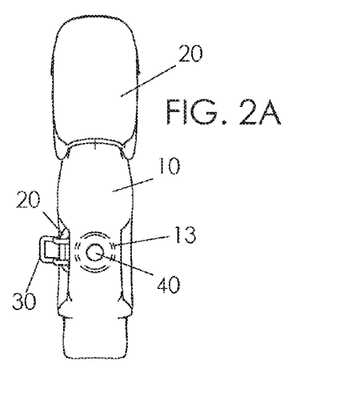
FIG. 2A is a rear elevational view of the tool of FIG. 2
Figure 3A:
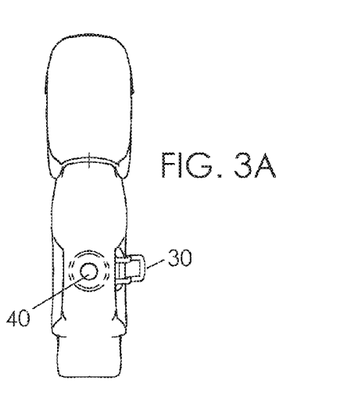
FIG. 3A is a rear elevational view of the tool of FIG. 3.
Figure 4:
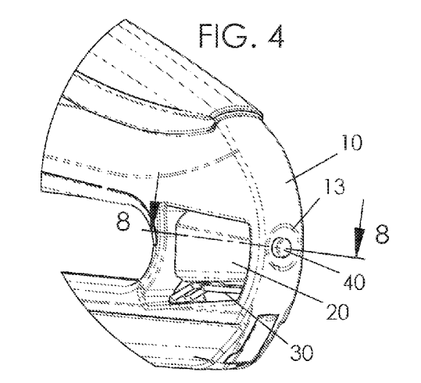
FIG. 4 is a left rear perspective detail view of the tool showing the hook in the stowed position.

In FIG. 2, the hook extends or protrudes out of the page from a left side of the tool and to the left of hook support 20, FIG. 2A. More broadly the hook is to a side of the hook support. This configuration will be convenient for a right-handed user, or where the work is to the right of a user. In this configuration when using the right hand the tool may be lifted in its usable position from a tool belt or equivalent item on the user. In this manner, the hand is placed atop handle 12 with the index finger extending through grip opening 17 at the front of the opening. In FIGS. 3 and 3A the hook extends from a right side of the tool as well suited for a left-handed user or a work object, implement, or tool that is to the left of a user where the left hand may be most convenient. The deployed hook extends substantially parallel to an exterior face of the body to form a "belt capture slot" whereby it normally captures a tool belt or similar item outside of and against the tool body.

In the preferred embodiment shown, the hook subassembly rotates about 180° between usable positions or stops, in about 90° increments. The hook may rotate other than 180°, for example, a full circle or less, if desired. This may require opening cavity 15 to be larger, extending farther above hook support 20, for example. As shown, opening cavity 15 extends downward whereby the hook stowed position has hook 30 located under hook support 20. The hook subassembly may further be rotated by increments other than about 90°, for example about 45° or other positions to fit the contours of a particular tool to which it is attached. In various embodiments, the hook subassembly rotation may be loose or free, friction damped, include hard stops, reversibly locked in place, or any combination thereof, as described in more detail below.

Figures 5, 6, 8, 9, 10:
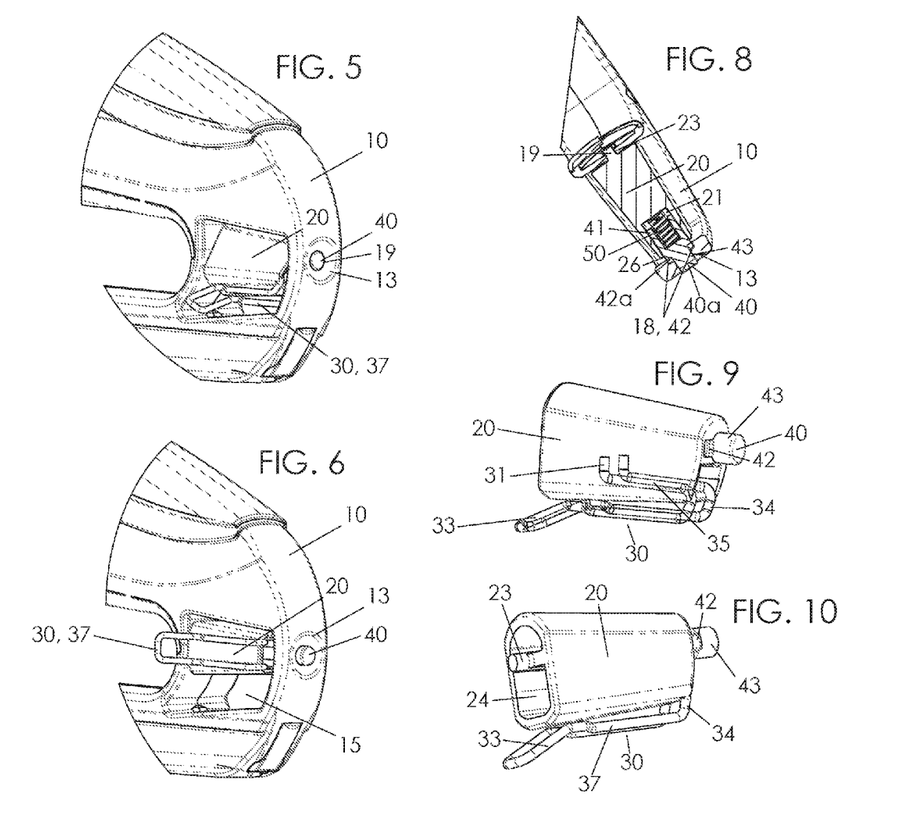
FIG. 5 is the tool of FIG. 4 with the hook in an intermediate position between deployed and stowed.
FIG. 6 is the tool of FIG. 4 with the hook deployed on the left side of the tool.
FIG. 8 is a partial cross-sectional view of the tool of FIG. 4 showing hook support and securing elements.
FIG. 9 is a left rear perspective view of a subassembly of a hook and support elements.
FIG. 10 is a left front perspective view of the subassembly of FIG. 9.
Figure 7:
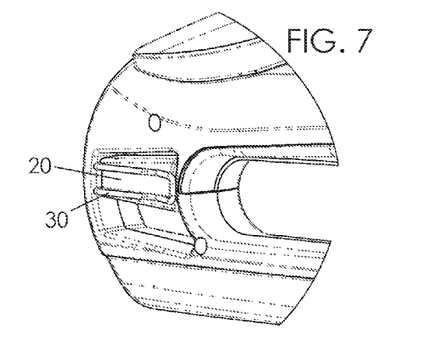
FIG. 7 is a right front perspective detail view of a rear of the tool of FIG. 4 with the hook deployed on the right side of the tool.
Figure 11:
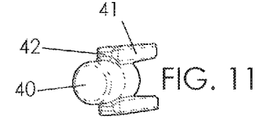
FIG. 11 is a rear perspective view of a hook subassembly release button.
Figure 12:
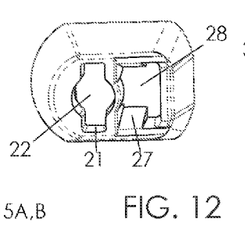
FIG. 12 is a rear perspective view of a hook support structure.
Figure 15A:
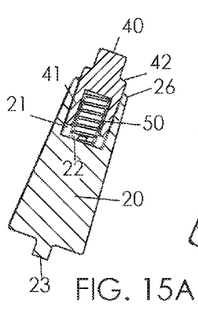
FIG. 15A is a cross-sectional view of the subassembly of FIG. 14, with the belt hook not shown and with a release button extended.
Figure 15B:
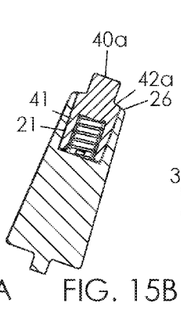
FIG. 15B is the view of FIG. 15A with the release button pressed.
Figure 16:
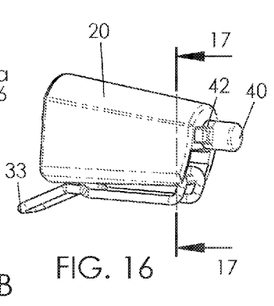
FIG. 16 is the view of FIG. 9 with a section line indicated.
Figure 17:
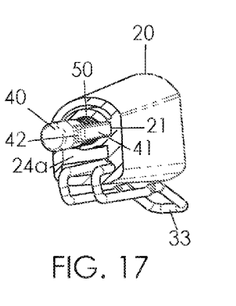
FIG. 17 is the perspective, partial cross-sectional view indicated in FIG. 16.
Figure 18:
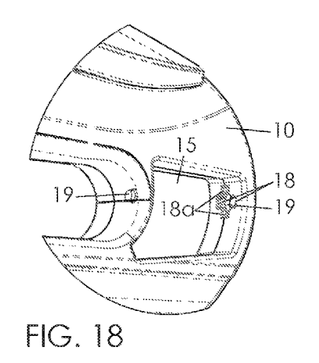
FIG. 18 is a left, front perspective view of a tool housing showing a subassembly mounting.

Button 40 is slidably fitted to hook support 20; see FIGS. 8, 15A and 15B. FIGS. 11 and 12 show these separate parts. Spring 50 or equivalent element biases button 40 out of recess 22. Flanges 41 of button 40 terminate outwardly at shoulders 42. Slot or slots 21 receive flanges 41. Button 40 therefore can move axially in and out of recess 22, between a disengaged and an engaged position respectively. Button 40 is substantially fixed in rotation within or upon hook support 20, with an allowance for some looseness as a result of normal mechanical tolerance. In the normal outward position of FIGS. 8 and 15A, shoulders 42 engage notches or equivalent ribs 18 of housing 10. In FIG. 8, horizontal notches 18 are engaged by shoulders 42. In the deployed left or right hook positions, FIGS. 2 and 3, vertical notches 18a, FIG. 18, are engaged by shoulders 42. Other relative relations between notches 18, 18a and shoulders 42 are contemplated. For example, slots 21 may be positioned about 90° or other angle to the vertical orientation shown in the view of FIG. 12. With shoulders 42 engaged to notches 18 or 18a, the hook subassembly is in a fixed or set position, held securely from rotating within cavity 15 or other equivalent location. If spring 50 is stiff enough then the stops may be less determinate or at the limit there are no stops or notches 18 at all whereby hook support 20 rotates against a simple friction engagement for example pressing shoulders 42 against a relatively smooth surface of body 10. Alternatively, spring 50 may be softer or, along with button 40, not present at all whereby hook support 20 rotates freely.

Button 40 is exposed and accessible for use on a rear of the tool body as shown. To change the position of the hook, button 40 is pressed inward against the bias of spring 50 to the retracted button position shown in FIGS. 5 and 15B. Button 40 and the hook support structure are then in a released position. Recess 13 surrounding button 40 allows for full pressing of the button while holding the button generally flush with a surrounding housing surface or body envelope in the normal extended position of the button. In this way, the button will not protrude from the tool and can not be easily be pressed accidentally.

With the button pressed, shoulders 42 are now flush with a rear 26 of hook support 20, FIG. 15B. As seen in FIG. 8, dashed lines, button 40 moves to the position 40a while shoulder 42 moves to 42a. This condition retracts the shoulders from notches 18, see also FIG. 18. In FIG. 5, the hook subassembly is in an intermediate position between the three preferred positions of stowed and deployed. When the hook is moved to one of these preferably three determinate positions, button 40 automatically pops out into notches 18 or 18a under the bias of spring 50 to hold and operationally fix the selected position of the hook support to the body. No further user action is required to fix the selected position. More or fewer determinate positions or stops may be provided by having more or fewer notches or other equivalent structures.

Preferably, there are redundant features to hold rotational positions of the respective parts. For example, the exemplary embodiment has two slots 21 in hook support 20 with corresponding two flanges 41 of the button structure. Further, there are a pair of respective body notches 18 and 18a to engage the pair of button shoulders 42. With more than one rotational fixing feature, the hook is securely held in a selected position. More or fewer than two of each feature or equivalent may be used. The hook is rotationally fixed within movable limits determined by part tolerance and function.

Figure 13:
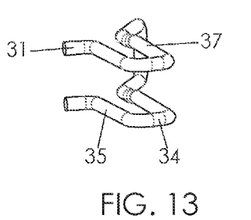
FIG. 13 is a rear perspective view of a belt hook.
Figure 14:
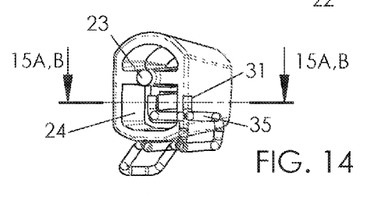
FIG. 14 is a front perspective view of the subassembly of FIG. 10, viewed from a more front position.
Figure 14A:
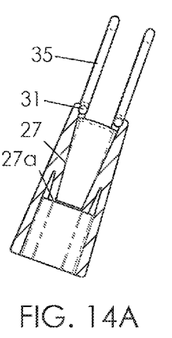
FIG. 14A is the cross-sectional view indicated in FIG. 14 in a pre-assembly condition.
Figure 14B:
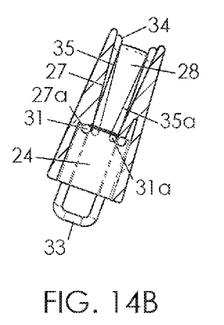
FIG. 14B is the view of FIG. 14A in an assembled condition.

Hook support 20 may be a molded part with hollow front interior 24 (FIG. 10) and a back for the rear features (FIG. 12). This helps keep the structure light weight to minimize its effect on use of the associated tool. Along with recess 22 for button 40, there is an optional ramp 27. As seen in FIGS. 14A and 14B, ramp 27 allows for a snap fit of hook 30 into hook support 20. Hook 30 is a preferably wire-formed structure while it may also be formed from sheet metal, plastic, fiberglass, or other material. The hook includes U returns 34 and internal legs 35. Preferably single leg 37, FIGS. 10 and 13 for example, is the operative element to form the tool belt capture slot. Bent ends 31 hold the hook within hook support 20 as seen in FIGS. 14 and 14B. See also FIG. 9 for the positions of these hook elements within hook support 20. To assemble the hook to the hook support, legs 35 are pressed inward along ramps 27, FIG. 14A. The legs deflect inward, 31a and 35a, until bent ends 31 have slid to catches 27a, FIG. 14B. The legs then snap into position where bent ends 31 are locked behind catches 27. Elongated recess 28 holds and stabilizes legs 35 against normal forces of use that would move the legs laterally within hook support 20 while catches 27 hold the hook from pulling rearward out of the hook support. The preferred embodiment snap fitted design is compact, low weight, and low cost. Angled end 33 of the hook guides the hook to behind a belt, waist band or other item of attire.

As shown, the hook has a single operative leg 37 with the single leg extending along an outside of hook support 20. The hook leg is able to move within and beyond an envelope of the body. As described herein, the envelope of the body is the shape, size or bulk of the body absent any protruding structure of a belt hook. The preferably single leg may include the two joined wire elements illustrated or the sheet metal structure described above.

As shown, opening cavity 15 is fully surrounded within body 10. In alternative embodiments, the hook subassembly may be fitted into a recess of the body, for example, open at a rear of the tool (not shown). Further, the hook may be mounted substantially externally to the tool, for example, upon ribs extending from the body (not shown) so that the hook subassembly is more exposed on the body.

FIGS. 19 to 22 show a tool using an alternative embodiment deployable tool belt hook. Handle 112 is pivoted near a front of body 110, left side in FIG. 19. Grip opening 117 extends from a central area toward a rear of the body. In the illustrated staple gun type fastening device the main operational components, not shown, are in front of grip opening 117. The hook structure shown may be applicable when there is more limited space available for the hook feature compared for example to the structure of the tool of FIGS. 1 to 18. Hook 130 is preferably a wire form or equivalent structure.

Figure 19:
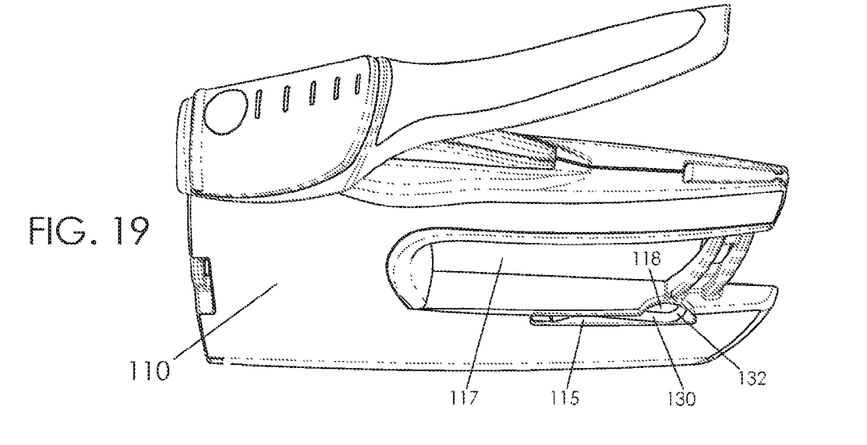
FIG. 19 is a top left side perspective view of a tool with an alternative embodiment deployable belt hook, with the hook stowed.

As seen hook 130 fits within narrow cavity or slot 115 without obstructing grip opening 117. Slot 115 is about a same height as a diameter of the wire of hook 130, being less than two times such a diameter. Fastener track 180 is immediately below slot 115 so that slot 115 fits in a small space between track 180 and grip opening 117. Similar to cavity 15 of FIGS. 1 to 18, the slot forming cavity 115 is located adjacent to and at a rear of the grip opening. In FIGS. 19 and 22B the hook is stowed. The hook including rear loop 132 is within confines of body 110 whereby the stowed hook does not add to a bulk of the tool. In the other assembly drawing figures, the hook is deployed in an operative position and available for use. The hook is widest at loop 132 and narrowest at clip area 131. Loop 132, inner leg 136 and outer leg 137 are all substantially co-planar whereby the wire form of hook 130 fits into narrow cavity slot 115. In this manner, the plane of the hook defined by the loop and legs is substantially perpendicular to a horizontal plane of the tool as defined by the page of FIGS. 22B and 22C. When deployed leg 137 forms a belt capture slot between body 110 and leg 137, FIG. 22C.

Figures 22, 22A:
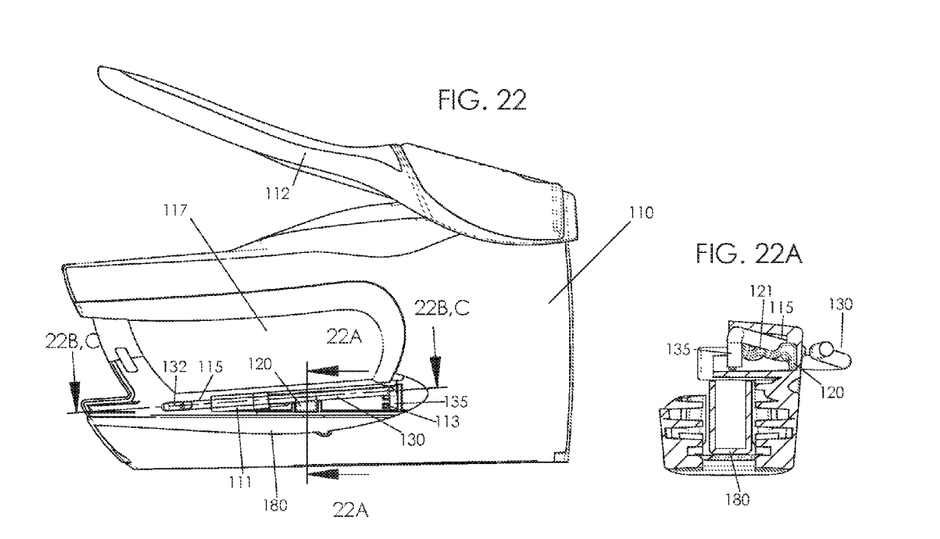
FIG. 22 is a right side elevational view of the tool of FIG. 19 with a cut-away exposing hook elements.
FIG. 22A is a transverse cross-sectional view at a hook mounting of the tool of FIG. 22.
Figure 22B:
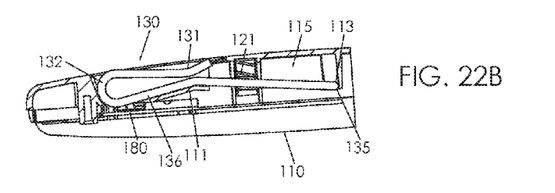
FIG. 22B is a longitudinal cross-sectional view of the tool of FIG. 22 with the hook stowed.
Figure 22C:
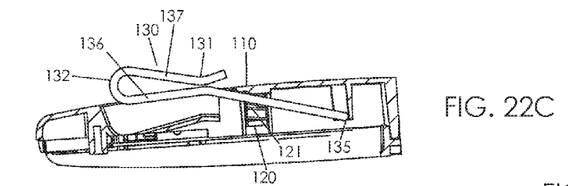
FIG. 22C is the view of FIG. 22B with the hook deployed.
Figure 23:
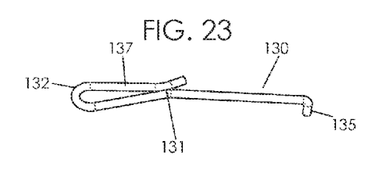
FIG. 23 is a perspective view of a belt hook component of FIGS. 19-22.

In FIG. 22 hook pivot 135 is seen. The hook pivots about hinge area 113 of body 110 with a hook pivot axis described by pivot 135 being vertical, see also FIG. 22A. As shown, hinge area 113 includes a member from both halves of the housing body 110 which meet at pivot 135 to rotatably confine the hook. In the stowed position, inner leg 136 abuts rib 111, or other limit stop structure, FIG. 22B. Inner leg 136 is between loop 132 and pivot 135.

Figure 20:
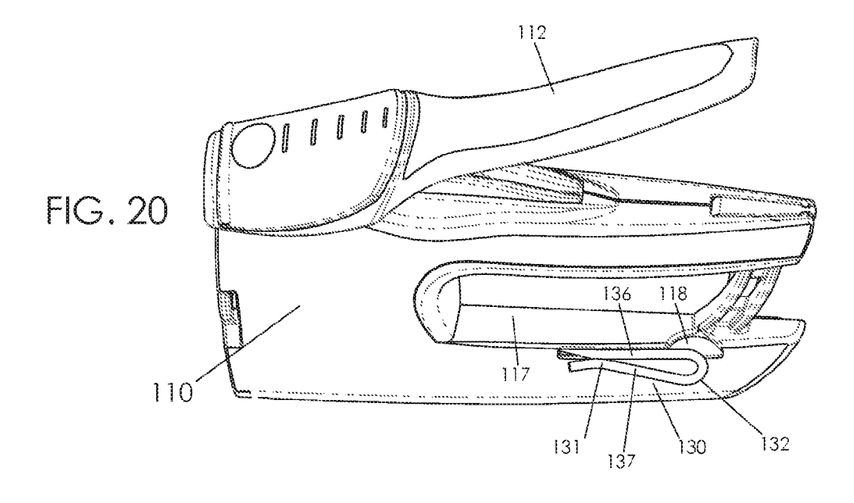
FIG. 20 is the tool of FIG. 19 with the hook deployed.
Figure 21:
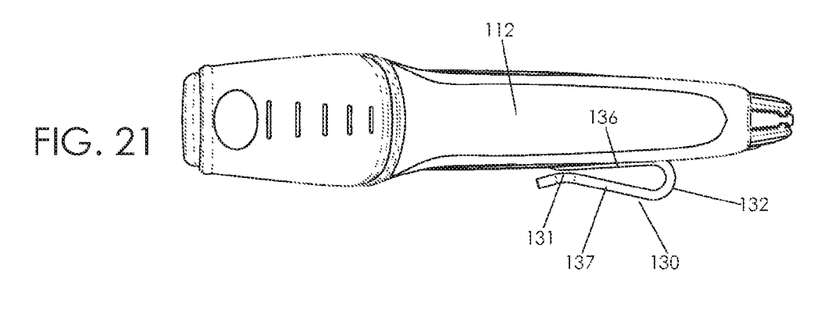
FIG. 21 is a top view of the tool of FIG. 20.

Access opening 118, FIGS. 19 and 20, provides finger access to pull on loop 132 to allow outward deployment of the hook. Resilient detent bumper 120 includes exemplary ridge 121 to hold the hook stable in either the deployed or stowed position. Optionally, the bumper or equivalent structure may be relatively rigid while deflection of the hook wire provides the detent action. With the hook deployed and stable the tool can be clipped or held on a tool belt or equivalent item a user is wearing. The hook remains available for use in this configuration. If the hook is no longer needed it can be easily moved out of the way to the stowed position.

Optionally, the hook of FIGS. 19 to 22 may be held in a position by a secondary structure such as a thumb screw, lever or similar, not shown. In particular, in the deployed position the hook then cannot be unintentionally pushed back in from its operative position.

Figure 24:
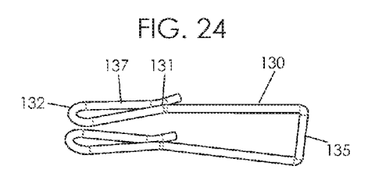
FIG. 24 is an alternative embodiment double hook.

As shown hook 130 deploys from a single side of the tool. Optionally, the hook could extend both directions for example by rotating about its long axis, not shown, and pivoting out the right housing side. Further there may be two hooks stacked, not shown, that fit in a partially wider slot 115 and operate in opposed directions. Hook 130 may include a structure with two vertically spaced parallel hooks, FIG. 24. Such a double hook pivots about the same pivot 135. This taller structure may be suited when there is enough free space in the tool body to fit. Slot cavity 115 then has two spaced parallel slots or a wider single slot.

While the particular forms of the invention have been illustrated and described, it will be apparent to those skilled in the art that various modifications can be made without departing from the spirit and scope of the invention. It is contemplated that elements from one embodiment may be combined or substituted with elements from another embodiment.

What is claimed is:

1. A portable tool, comprising:
    a body including a front, a rear, a top, a bottom, and left and right sides;
    an elongated cavity in the body;
    an elongated belt hook pivotable upon a rotation axis of the body from within the cavity between a deployed position and a stowed position, the deployed position including the belt hook protruding outward sideways from the cavity and extending substantially parallel to an exterior of the body, the stowed position having the belt hook confined within the cavity of the body to be vertically aligned with the rotation axis; and
    the belt hook includes an inner leg, an outer leg, and a loop between the legs, the inner leg and the outer leg both being within the cavity for the stowed position of the hook and the outer leg rotating about the rotation axis to be outside of the cavity for the deployed position of the hook.

2. The portable tool of claim 1, wherein the hook is a wire form, and the inner leg remains within the cavity for the deployed position of the hook.

3. The portable tool of claim 1, wherein a movable handle extends longitudinally above the body, a grip opening extends through the body below the handle; the cavity is open to a side of the body adjacent the grip opening, and the deployed position of the hook has the outer leg forming a tool belt capture slot outside the tool body.

4. The portable tool of claim 1, wherein the cavity is surrounded within the body, and wherein the cavity is confined between a top and a bottom structure of the body.

5. The portable tool of claim 1, wherein the hook is fitted to a hook support structure, the hook support structure is pivotable within the cavity of the body, and the inner leg is held within the hook support structure.

6. A portable tool, comprising:
a body including a front, a rear, a top, a bottom, and left and right sides;
an elongated cavity in the body;
a hook support structure fitted to the body within the cavity and pivotable about a fixed axis of the body, the axis extending from a first end to a second end of the cavity;
an elongated belt hook attached to the hook support structure with a leg of the hook extending along an outside of the hook support structure, the belt hook mounted to the body within the cavity along the fixed axis for each of a deployed position and a stowed position, the deployed position including the belt hook protruding outward from the cavity beyond an envelope of the tool body, the stowed position having the belt hook confined within the cavity of the body; and
a stowed position of the hook including the hook being within the cavity and vertically aligned with the fixed axis, and a deployed position of the hook including the hook being to a side of the hook fixed axis.

7. The portable tool of claim 6, wherein a resiliently biased member engages the hook support structure to rotationally fix the hook support structure to the body, the member being movable against the bias to free the hook support structure to rotate about the axis of the body.

8. The portable tool of claim 7, wherein the hook support structure includes at least three defined positions including a left and a right deployed position on the body, and the stowed position.

9. The portable tool of claim 7, wherein the member includes a button, and the button is movable axially on the hook support structure between a normal engaged and a pressed disengaged position, and the button is exposed and accessible for use on a rear of the body.

10. The portable tool of claim 9, wherein a slot receives a flange to rotationally fix the button to the hook support structure in a sliding relationship, and a shoulder of the button engages a notch of the body to fix the belt hook to the body in a selected rotational position.

11. A portable tool, comprising:
a body including a front, a rear, and left and right sides; and
an elongated hook rotatably movable upon a fixed rotation axis of the body between a deployed position and a stowed position, the deployed position including the a leg of the hook forming a protruding structure outward from an envelope of the body and extending substantially parallel to an exterior of the body to form a tool belt capture slot, the stowed position having the leg of the hook confined within a cavity of the body between the left and the right sides, wherein the leg is confined within the envelope of the body.

12. The portable tool of claim 11, wherein the cavity is surrounded by a top and a bottom of the body to enclose the rotation axis from above and below, and the stowed hook fits within the envelope of the tool without protrusions therefrom.

13. The portable tool of claim 11, wherein the rotation axis extends along a length of the body.

14. The portable tool of claim 13, wherein the hook is mounted to a separate hook support structure, and the hook support structure rotates about the rotation axis.

15. The portable tool of claim 14, wherein the hook support structure is confined within the cavity of the body.

16. The portable tool of claim 15, wherein the hook support structure includes a release button, the button extends from a rear of the support structure to be exposed at a rear of the tool body, the button includes a set position to secure the hook structure from rotating upon the tool body, and the button includes a released position wherein the support structure is free to rotate upon the tool body.

17. The portable tool of claim 16, wherein the button includes a normal outward position corresponding to the set position and an inward pressed position corresponding to the released position, the button able to the pressed at the rear of the tool body.

18. The portable tool of claim 17, wherein the button is fixed in rotation to the support structure and is movable along the axis of rotation between the outward position and the inward position, the button includes shoulders, and in the outward position the shoulders engage ribs of the housing body to secure the support structure from rotating.

19. The portable tool of claim 11, wherein the hook includes a left protruding deployed position, a right protruding deployed position, and a non-protruding stowed position, and the hook is vertically aligned with the rotation axis in the stowed position.

* * * * *